(12) United States Patent
Wandtke et al.

(10) Patent No.: US 8,172,257 B2
(45) Date of Patent: May 8, 2012

(54) SAFETY DEVICE FOR A MOTOR VEHICLE

(75) Inventors: Sebastian Wandtke, Göttingen (DE); Sabine Lindemann, Habichtswald (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 310 days.

(21) Appl. No.: 12/529,081

(22) PCT Filed: Mar. 25, 2008

(86) PCT No.: PCT/EP2008/053466
§ 371 (c)(1),
(2), (4) Date: Dec. 8, 2009

(87) PCT Pub. No.: WO2008/119690
PCT Pub. Date: Oct. 9, 2008

(65) Prior Publication Data
US 2010/0072734 A1    Mar. 25, 2010

(30) Foreign Application Priority Data
Mar. 29, 2007    (DE) .......................... 10 2007 015 605

(51) Int. Cl.
*B60R 21/21* (2011.01)
(52) U.S. Cl. .................................. 280/728.2; 280/730.2
(58) Field of Classification Search ............... 280/728.2, 280/730.2, 728.3, 743.1, 741
See application file for complete search history.

(56) References Cited

U.S. PATENT DOCUMENTS

| | | | | |
|---|---|---|---|---|
| 5,316,336 A * | 5/1994 | Taguchi et al. ............. | 280/730.2 |
| 5,890,733 A | 4/1999 | Dillon | |
| 5,921,576 A * | 7/1999 | Sinnhuber ................. | 280/730.2 |
| 6,017,055 A | 1/2000 | Cuevas | |
| 7,040,647 B2 * | 5/2006 | Deligny et al. ............ | 280/728.2 |
| 7,090,243 B2 * | 8/2006 | Igawa ........................ | 280/728.2 |
| 7,246,817 B2 * | 7/2007 | Tanase ...................... | 280/730.2 |
| 7,384,063 B2 | 6/2008 | Riester | |
| 7,490,851 B2 | 2/2009 | Riester | |
| 7,527,287 B2 * | 5/2009 | Kjell et al. ................. | 280/730.2 |
| 7,581,751 B2 * | 9/2009 | Ochiai et al. ............... | 280/730.2 |
| 7,597,349 B2 * | 10/2009 | Ochiai et al. ............... | 280/730.2 |
| 7,621,559 B2 * | 11/2009 | Seong ........................ | 280/730.2 |
| 7,703,797 B2 * | 4/2010 | Wright ....................... | 280/728.2 |
| 7,766,380 B2 * | 8/2010 | Tonooka et al. ........... | 280/730.2 |

(Continued)

FOREIGN PATENT DOCUMENTS

DE    19850648 A1    5/1999

(Continued)

OTHER PUBLICATIONS

International Search Report for corresponding application PCT/EP2008/053466, dated Jul. 8, 2008.

(Continued)

*Primary Examiner* — Paul N Dickson
*Assistant Examiner* — Karen A Beck
(74) *Attorney, Agent, or Firm* — Timothy X. Gibson; Gibson & Dernier LLP (57) ABSTRACT

The invention relates to a mounting for an airbag module for a vehicle door, with said mounting developed by at least two components arranged at a distance relative to each other, with said components provided to accommodate an airbag module, with at least one of said components designed to develop a locking connection with said airbag module.

17 Claims, 7 Drawing Sheets

U.S. PATENT DOCUMENTS

| | | | |
|---|---|---|---|
| 7,784,824 B2 * | 8/2010 | Sato | 280/730.2 |
| 2005/0057024 A1 * | 3/2005 | Weston et al. | 280/730.2 |
| 2005/0253364 A1 * | 11/2005 | Wallentin et al. | 280/728.2 |
| 2006/0197322 A1 | 9/2006 | Riester | |
| 2006/0208468 A1 | 9/2006 | Riester | |
| 2007/0029764 A1 * | 2/2007 | Ochiai et al. | 280/730.2 |
| 2007/0029765 A1 * | 2/2007 | Ochiai et al. | 280/730.2 |
| 2007/0108742 A1 * | 5/2007 | Itakura | 280/728.3 |
| 2007/0170705 A1 * | 7/2007 | Lindemann et al. | 280/730.2 |
| 2007/0176399 A1 * | 8/2007 | Kullack | 280/728.3 |
| 2008/0197609 A1 * | 8/2008 | Jaramillo et al. | 280/730.2 |
| 2010/0019474 A1 * | 1/2010 | Kaneda et al. | 280/730.2 |
| 2010/0025973 A1 * | 2/2010 | Jang et al. | 280/730.2 |
| 2010/0072734 A1 * | 3/2010 | Wandtke et al. | 280/728.2 |

FOREIGN PATENT DOCUMENTS

| | | |
|---|---|---|
| DE | 10156101 A1 | 6/2003 |
| DE | 10315622 A1 | 11/2004 |
| DE | 102004058506 A1 | 6/2006 |
| DE | 102005010024 A1 | 10/2006 |
| DE | 102005010025 A1 | 10/2006 |
| WO | 9817507 A1 | 4/1998 |
| WO | 2004087473 A | 10/2004 |
| WO | 2006058641 A1 | 6/2006 |

OTHER PUBLICATIONS

Anonymous: "Deployable door trim panel" Research Disclosure, Mason Publications vol. 458, No. 101 (2002) GB.

* cited by examiner

SAFETY DEVICE FOR A MOTOR VEHICLE

FIELD OF THE INVENTION

The invention relates to a mounting for an airbag module for a vehicle door, a door trim panel comprising a mounting for an airbag module for a vehicle door, an inside door panel comprising a mounting for an airbag module, a method for mounting an airbag module to a vehicle door, as well as a vehicle door comprising an air bag module.

BACKGROUND

Nowadays, special safety systems for passengers are installed in almost all vehicle categories to protect the passengers from serious injuries in the vent of a crash. In addition to passive safety systems, such as for example predetermined breaking points, collapsible zones of the passenger cell, particularly active safety systems in the form of airbags take on an important role in this regard. Although initially many vehicles were equipped only with one airbag developed in the front area of the vehicle interior, e.g. as a steering wheel airbag, side airbags and head airbags are by now used in many vehicle categories. While side airbags are mostly intended to protect passengers from sustaining serious injuries in the pelvic and thoracic region, the purpose of head airbags is to protect the driver's head from injuries during serious side impacts and rollovers of the vehicle. This is especially relevant for the application in convertibles, since corresponding protection of the head region by a roofliner of the vehicle is not provided.

Head airbags may generally be integrated into the roofliner of vehicles, but also into door trim panel areas. Given the fact that convertibles have no roofliner, the integration of the head airbag into the door trim panel is a possibility in this connection to provide a corresponding head safety device for passengers. DE 10 2005 010 025 A1, for example, describes such a vehicle door trim panel comprising a head impact protection device for passengers.

Moreover, various additional installations of head airbags in vehicle doors are known from prior art. DE 10 2005 010 024 A1, for example, describes a vehicle door trim panel for a vehicle with a head impact protection device for passengers. As a module the head impact protection device comprises an airbag support, an airbag, as well as a gas generator in this connection. DE 10 2004 058 506 A1 discloses a vehicle door with an integrated side impact protection device for passengers. The relevant airbag device is arranged between the edge reinforcement hollow profile and a door trim panel part. DE 103 15 622 A1 describes a safety device for a vehicle arranged behind the interior paneling. DE 103 15 622 A1 discloses an airbag module arranged between the inside door panel and the door trim panel, with part of the inside door panel or the door trim panel serving as a deployment channel. The disadvantage of such head airbag safety devices as described is that airbag modules with high cost of materials and complex assembly must be installed into the door trim panel.

SUMMARY OF THE INVENTION

In contrast, the aim of the invention is to create an improved mounting for an airbag module for a vehicle door, an improved door trim panel comprising a mounting for an airbag module for a vehicle door, an improved inside door panel comprising a mounting for an airbag module for a vehicle door, a more simplified method for assembling an airbag module at a vehicle door, as well as an improved vehicle door comprising an airbag module, thereby optimizing the material and labor costs for assembling airbag modules in door trim panels.

In each case, the tasks underlying the invention are solved by the characteristics disclosed herein. Preferred embodiments of the invention are disclosed herein.

According to the invention, a mounting is created for an airbag module for a vehicle door, with said mounting developed by at least two components arranged at a distance relative to each other, and the components for accommodating an airbag module provided. At least one of the components is developed with the airbag module to embody a locking connection. Employing a mounting in the form of two components arranged at a distance relative to each other has the advantage that said components arranged at a distance relative to each other can be used for assembling the airbag module instead of an elaborately designed reinforcement of the door's armrest. To this end, the airbag module must only be clipped or hung into at least one of the two mountings, thereby reducing the assembly costs considerably.

An arrangement at a distance relative to each other in this connection is understood to mean that the two components can be separated from each other completely, but that they can also be connected to each other through a weak mechanical link. A mounted connection or transport connection, for example, constitutes such a weak mechanical link, which allow for joint assembly of the components into the door's armrest or into the inside door panel. However, in this case, the mounted or transport connection is not utilized to mount or implement the functionality of the airbag module.

According to one embodiment of the invention, the components to accommodate the airbag lance are essentially provided at the opposite ends of the airbag module's gas sack. This ensures that the forces that occur when the airbag is triggered and thus the gas sack is deployed are optimally transmitted to the door trim panel, and that they can be absorbed by said door trim panel.

According to one embodiment of the invention, the mounting at the inside door panel or at the door trim panel can be fixed by means of fasteners. Alternatively, the mounting is integrally embodied with the door trim panel. Additional material and assembly costs can further be reduced by integrally embodying the mounting with the door trim panel.

According to one embodiment of the invention, the locking connection with the airbag module involves a snap joint. This way, fixing the airbag module to the mounting, and thus to the door trim panel or to the inside door panel, can be realized through a simple horizontal and/or vertical movement during installation.

According to one embodiment of the invention, the fastener used to fix the mounting at the door trim panel or at the inside door panel involves locking means. The advantage is that different mountings for accommodating various airbag modules can be used for any given door trim panel. This is especially relevant when door trim panel parts must be used in different vehicle categories with different requirements for corresponding airbags. For example, an airbag specifically developed for convertibles, as well as the same or a different airbag dimensioned for limousines may be installed in the same door trim panel.

According to one embodiment of the invention, the components arranged at a distance relative to each other are embodied to guide the gas sack of the airbag module. Thus, additional guide elements that are for example injected to the door trim panel may be abandoned.

According to one embodiment of the invention, the airbag along with the door trim panel and the inside door panel may be fixable. The advantage is that the locking connection between the mounting and the airbag module may be designed in a relatively weak manner compared to the simple pre-assembly of the airbag module. An extremely stable connection of the airbag module to the door trim panel and to the inside door panel, as required for the operational vehicle door with integrated airbag module, may however be accomplished in the course of the common screw connection, the hooking or locking of door trim panel or inside door panel. Thus, instead of fixing the airbag module separately with fasteners to the vehicle door, the fasteners required to fix the door trim panel and the inside door panel in this case anyway is used to simultaneously fix the airbag module. This leads to a further reduction of the labor costs required for the assembly, as well as to a further reduction of cost of materials.

According to one embodiment of the invention, the door trim panel comprises at least one geometrically defined pre-weakened section, with said pre-weakened section provided for the escape of the gas sack of the airbag module, and the mounting developed for lateral reinforcement of the area around said pre-weakened section. By using the mounting as reinforcement of the area around the pre-weakened section, the additional installation or development of reinforcements in the door trim panel in the escape area of the gas sack may essentially be abandoned.

The forces that occur when the airbag module is triggered cause the door trim panel to free an opening in the area of the pre-weakened section, thus allowing the gas sack to escape. To guarantee that the door trim panel per se is fixed in its predetermined position in a stable manner anyway, even when the airbag module is triggered, forces affecting the door trim panel around the pre-weakened section must effectively be absorbed and deflected. This is realized by the mounting according to the invention. This allows to do without further, additional reinforcement measures for lateral reinforcement of the area around the pre-weakened section. If need be, however, the door trim panel may be provided with additional, possibly even integrally developed reinforcements, to lend additional stability to the door trim panel.

In a further aspect the invention relates to a door trim panel comprising a mounting for an airbag module for a vehicle door, with said mounting developed by at least two components arranged at a distance relative to each other, and the components provided for accommodating an airbag module, with at least one of the components embodied to develop a locking connection with said airbag module. To this end, the components to accommodate the airbag lance are essentially provided at the opposite ends of the airbag module's gas sack.

According to one embodiment of the invention, the locking connection involves a snap joint.

According to one embodiment of the invention, the mounting of the door trim panel is fixable by means of fasteners at said door trim panel, or integrally formed with the door trim panel, as described hereinabove.

According to one embodiment of the invention, the door trim panel comprises at least one pre-weakened section, with said pre-weakened section provided for the escape of the airbag module's gas sack, with a portion of said pre-weakened section foldable in the form of a flap upon escape of the gas sack, with the mounting to reinforce the area essentially developed around said pre-weakened section.

To this end, the flap may be connected with the door trim panel by at least one hinge-like, tear-resistant material. Said hinge-like, tear-resistant material may, for example, be realized through a simple net strip. The advantage is that the flap cannot be torn into the vehicle interior when the airbag module is triggered, which would present a significant risk of injury for the passengers.

According to one embodiment of the invention, the inside door panel and the door trim panel are provided as part of the deployment channel of the airbag module's gas sack. Alternatively, a rear panel at the inside door panel may be arranged such that said rear panel and the door trim panel are developed as deployment channel for the airbag's gas sack. Using only the inside door panel and the door trim panel as deployment channel has the advantage that additional costs for materials and for the installation of a rear panel as a deployment channel can be reduced. If, however, using the inside door panel and the door trim panel as deployment channel for the airbag module's gas sack is not an option due to the specific design conditions of the inside door panel or for other reasons, an additional rear panel may still be mounted in the usual way to guarantee complete functionality of the airbag module.

In a further aspect the invention relates to a method for installing an airbag module at a vehicle door, with said vehicle door comprising a mounting for the airbag module, with said mounting developed by at least two components arranged at a distance relative to each other, and with said components provided to accommodate an airbag module, with at least one of said components embodied to develop a locking connection with said airbag module. To this end, the installation method according to the invention is composed of the following steps: For one, the airbag module is inserted inside the mounting. Preferably, said insertion of the airbag module into the mounting is accomplished through a horizontal movement. In a further step the airbag module is locked with at least one of the components by means of the locking connection. Finally, combined fixing of the door trim panel of the vehicle door with the airbag module and the inside door panel of the vehicle door takes place. These three steps guarantee a simple and efficient installation of an airbag module at a vehicle door. It is also possible to pre-install the corresponding parts in a modular design, making an even more efficient operation possible.

According to one embodiment of the invention, the method for installing an airbag module at a vehicle door further comprises the step of fastening the mounting at the inside door panel or at the door trim panel. As already described hereinabove, such fastening can also be realized, for example, through locking means by simply inserting the mounting into the inside door panel or inside the door trim panel. Alternatively, the mounting integrally embodied with the inside door panel or the door trim panel presents itself.

According to one embodiment of the invention, the method for installing an airbag module at a vehicle door further comprises the step of fastening an additional rear panel at the inside door panel. Said door panel is used as deployment channel and/or installation protection in connection with the door trim panel.

According to one embodiment of the invention, the rear panel is fixed along with the door trim panel of the vehicle door and the airbag module and inside door panel. This guarantees that a stable connection of rear panel, door trim panel, airbag module and inside door panel assures the airbag module's full functionality.

According to one embodiment of the invention, locking the airbag module is accomplished by a snap joint.

According to one embodiment of the invention, the door trim panel of the vehicle door with the airbag module and the inside panel door of the vehicle door are jointly fixed by means of joint fasteners.

In a further aspect the invention relates to an inside door panel comprising a mounting according to the invention, with said inside door panel further comprising a rear panel, with said rear panel developed as a deployment channel along with the door trim panel.

In a further aspect the invention relates to a vehicle door comprising an airbag module in a door trim panel and an inside door panel, with said airbag module fixed at the door trim panel and/or at the inside door panel. One section of the door trim panel comprises predetermined breaking points, with said section of said door trim panel developed in a rotatable manner around a swivel axis by separation at said predetermined breaking points, with said section of said door trim panel provided for the escape of the airbag module's gas sack, with reinforcement means developed around the section of said door trim panel, with said reinforcement means integrally developed with said door trim panel. The gas sack is provided for accommodation in an opening, with said opening limited by the inside door panel and the door trim panel with said reinforcement means. Said door trim panel comprises a foam layer and a decorative layer on the side facing the vehicle interior.

The advantage of the vehicle door comprising the airbag module according to the invention is that separate components in the form of a deployment channel as well as a railing can be eliminated. A section of the deployment channel is integrally developed as a reinforcement means with the door trim panel, and the inside door panel assumes the task of the deployment channel rear wall. This allows a considerable reduction in the cost of materials. Foam-backing the decorative layer creates a higher perceived quality, allowing the abandonment of separate components to form the deployment channel, thus representing a very cost-effective solution.

According to one embodiment of the invention, the predetermined breaking points are essentially developed on the level of the pivotal motion of the section of the door trim panel. The door trim panel comprises a pre-weakened section, with said pre-weakened section developed as a hinge to swivel the section of the door trim panel around the swivel axis. This guarantees that the section of the door trim panel performs a clean and defined pivotal motion in the direction of the vehicle interior when the airbag is triggered, making it possible for the airbag to deploy in vertical direction without obstruction.

According to one embodiment of the invention, the vehicle door further comprises a hinge-like, tear-resistant material, with the rotatable section of the door trim panel connected with the door trim panel in the area of the hinge through said hinge-like, tear-resistant material. This guarantees that the rotatable section of the door trim panel is not detachable from the remaining door trim panel and cannot be thrown into the vehicle interior under any circumstances when the airbag is triggered. Furthermore, the pivoting angle of the door trim panel's rotatable section can be fixed by appropriately designing the hinge-like, tear-resistant material.

According to one embodiment of the invention, the reinforcement means are essentially developed in a perpendicular manner relative to the door trim panel in the area in which the airbag module is fixed and/or in the deployment area of the gas sack. This guarantees the gas sack's lateral control as well as further stabilization of the door trim panel in the escape area of the airbag module's gas sack.

According to one embodiment of the invention, the vehicle door further comprises an abutment, with said abutment arranged beneath the airbag module, with said abutment provided to support the airbag module in vertical direction. To this end, said abutment is integrally developed with the door trim panel or the inside door panel. This way, the forces that occur when the airbag deploys can be effectively absorbed by the abutment and deflected to the vehicle door. Thus, a defined deployment of the airbag module's gas sack is guaranteed.

According to one embodiment of the invention, the airbag module concerns an airbag module for a head airbag.

In a further aspect the invention relates to a door trim panel for a vehicle door according to the invention.

In a further aspect the invention relates to a method for installing an airbag module at a vehicle door, with a vehicle door provided in a first step, with said vehicle door comprising an inside panel. In a further step a door trim panel is provided, with a section of said door trim panel comprising predetermined breaking points, with said section of said door trim panel embodied in a rotatable manner around a swivel axis by separation at said predetermined breaking points, with said section of said door trim panel provided for the escape of the airbag module's gas sack, with reinforcement means developed around the section of said door trim panel, with said reinforcement means integrally developed with said door trim panel, with said door trim panel comprising a foam layer and a decorative layer on the side facing the vehicle interior. In a further step a provided airbag module is mounted to the inside panel or at the door trim panel. Lastly, in a final step the door trim panel is mounted onto the vehicle door, thereby enclosing the airbag module's gas sack with an opening, with said opening limited by said inside door panel and said door trim panel with said reinforcement means developed therein.

The advantage of the method for installing an airbag module at a vehicle door according to the invention is that various work steps required pursuant to prior art can be eliminated. Neither a separate reinforcement piece, nor a separate rear panel must be mounted during the installation at the vehicle door or at the door trim panel. This allows for a more efficient mode of operation while simultaneously maintaining full functionality of the safety device defined by the vehicle door together with the airbag module.

Furthermore, according to one embodiment of the invention, the airbag module, the vehicle door and the door trim panel are fixed by joint fasteners. This guarantees high overall stability of the mounted vehicle door along with the integrated airbag module.

According to one embodiment of the invention, the predetermined breaking points are essentially developed on the level of the pivotal motion of the section of the door trim panel. The door trim panel comprises a pre-weakened section, with said pre-weakened section developed as a hinge to swivel the section of the door trim panel around the swivel axis.

Said door trim panel further comprises a hinge-like, tear-resistant material, with the rotatable section of the door trim panel additionally connected with the door trim panel in the area of the hinge through said hinge-like, tear-resistant material.

According to one embodiment of the invention, the reinforcement means are essentially developed in a perpendicular manner relative to the door trim panel in the area in which the airbag module is fixed and/or in the deployment area of the gas sack.

According to one embodiment of the invention an abutment is integrally developed with the door trim panel or the inside door panel, with said abutment arranged beneath the airbag module, with said abutment provided to support the airbag module in vertical direction.

BRIEF DESCRIPTION OF THE DRAWINGS

Preferred embodiments of the invention will be explained in detail below based on the drawings.

DETAILED DESCRIPTION OF THE INVENTION

Elements corresponding to one another will be identified with the same reference signs below.

Figure 1:
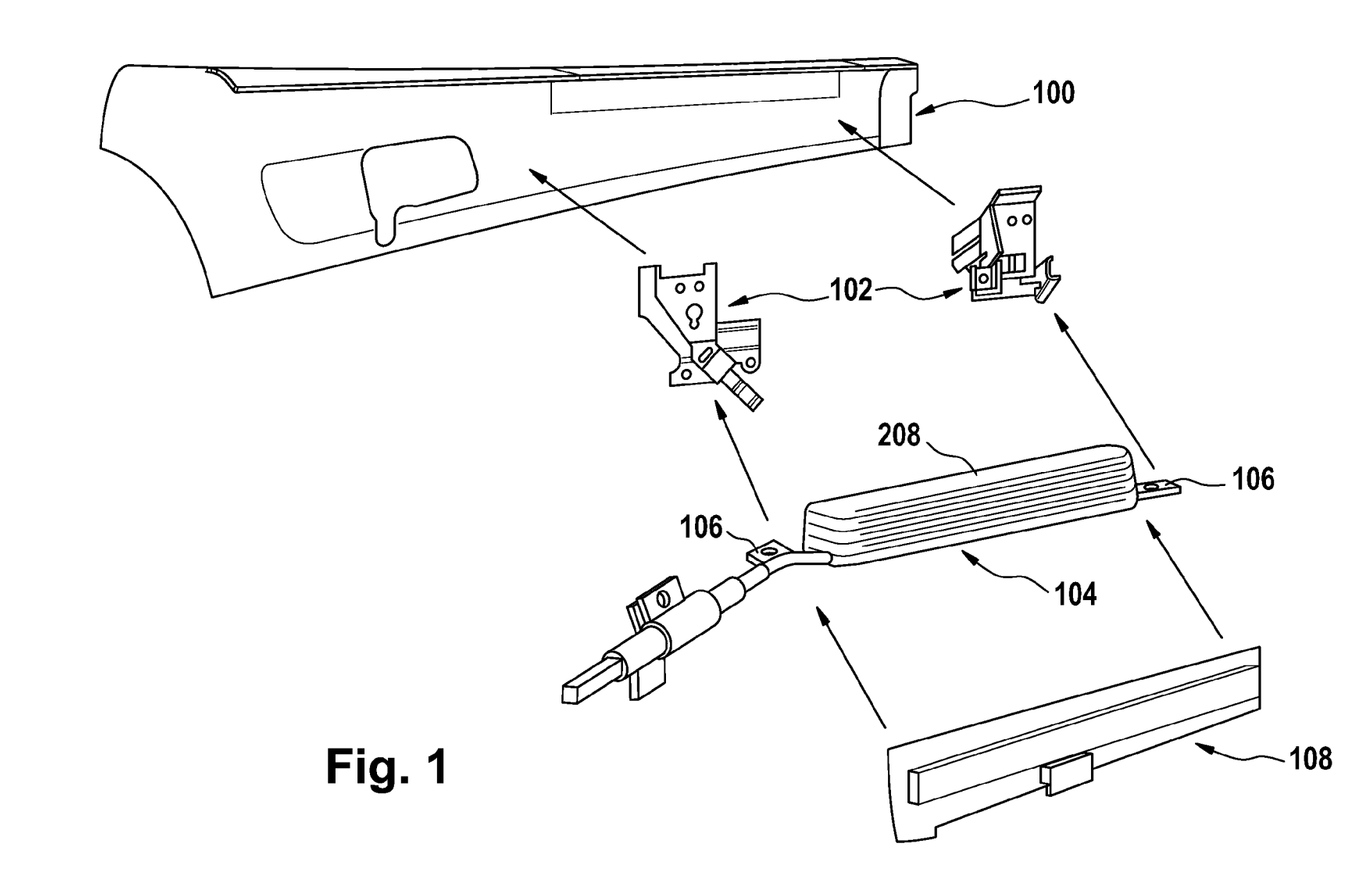
FIG. 1: shows a schematic view of a method according to the invention for installing an airbag module with a mounting according to the invention at a door trim panel.

FIG. 1 shows a schematic view of a method according to the invention for installing an airbag module 104 comprising a mounting 102 according to the invention at a door trim panel 100. In a first step the components 102 of the mounting according to the invention are fastened at the door trim panel 100. Said fastening may be accomplished by means of screw or locking connections. Alternatively, however, said components 102 are integrally developed with said door trim panel 100, making it possible to eliminate such an installation step. In a further step, the airbag module 104 is inserted into the components 102 of said mounting. Here, too, it is conceivable as an alternative to first fasten the components 102 to the airbag module 104, whereupon said components 102 are directly inserted into the door trim panel 100 along with the airbag module 104.

To this end, said components 102 are arranged such that the airbag lance is essentially accommodated by said components 102 at the opposite ends 106 of the gas sack 208. The reason being is that the greatest forces, which can thus effectively be absorbed by the components 102 and thus by the door trim panel 100 or by an inside door panel to which the arrangement is fastened, occur at the gas sack ends 106 in case the airbag module is triggered.

By inserting the airbag module into the components 102 the airbag module 104 locks with at least one of the components 102 by means of a locking connection. This guarantees that the airbag module 104 is at least temporarily fastened in a fixed position for the following additional installation steps. Locking with at least one of the components by means of a locking connection is particularly necessary only, since the airbag lance only needs to bear on the opposite component 102 for the purpose of pre-assembly.

Ultimately, in a final work step the door trim panel 100 of the vehicle door is jointly fixed with the airbag module 104 and the inside door panel of the vehicle door—not shown here. As already mentioned, said door trim panel 100 and said inside door panel—not shown here—serve as part of the deployment channel for the gas sack 208 of the airbag module 104. The two components 102 comprise an additional part of the lateral deployment channel. Alternatively to using the inside door panel, it is also possible to additionally mount a rear panel 108 at said inside door panel or at the airbag module 104, with said rear panel 108 taking on the task of the deployment channel in conjunction with the door trim panel 100 of the vehicle door and the two components 102.

Figure 2:
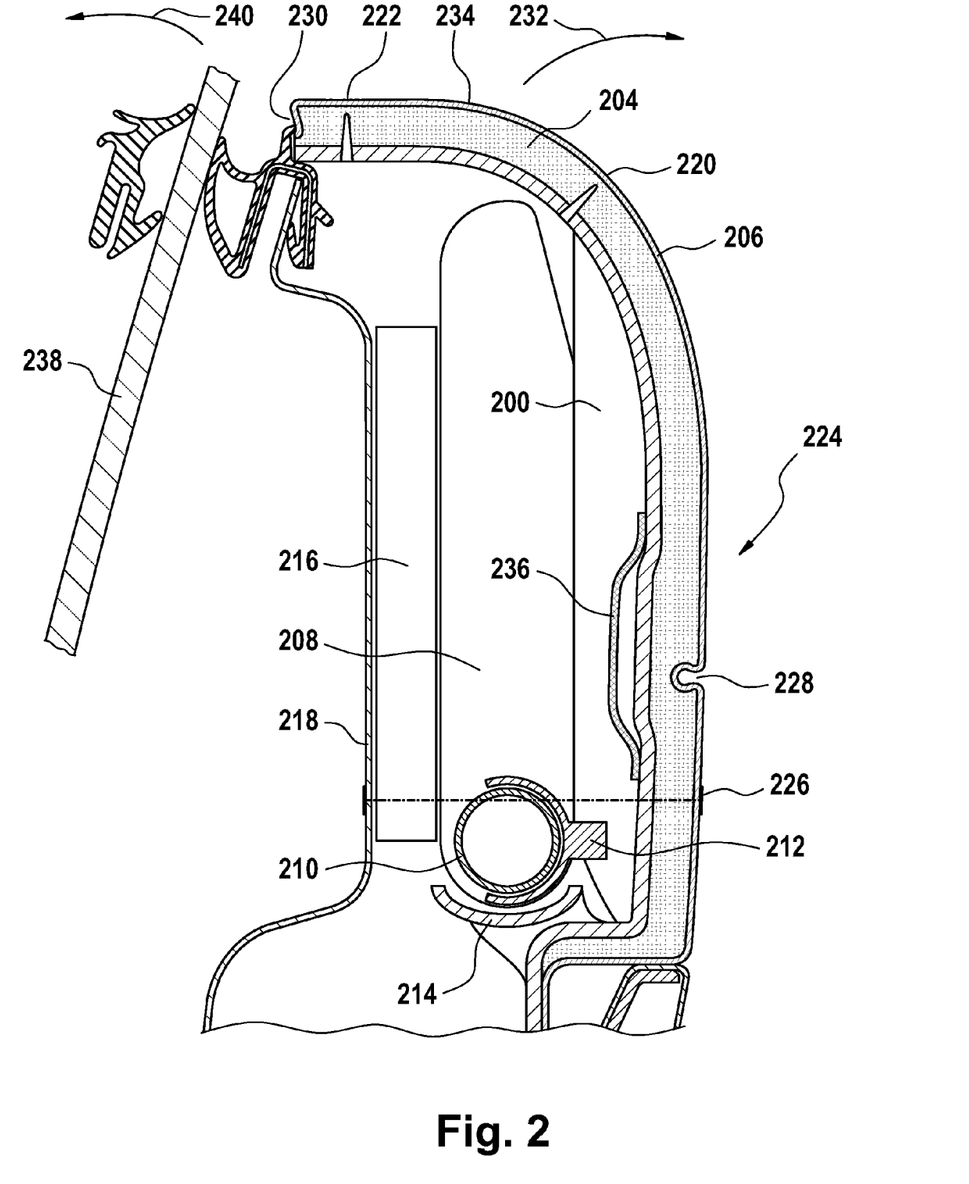
FIG. 2: shows a schematic view of an installed airbag module at a mounting according to the invention at a vehicle door.

FIG. 2 shows a schematic view of an installed airbag module 104 at a mounting 212 according to the invention at a vehicle door 224. To this end, the door trim panel 200 of said vehicle door 224 comprises a foam-backing 204, as well as a decorative layer 206. The door trim panel 100 may be comprised of a support, with said support developed, for example, from plastic or wood fibers. Said airbag module 104 is fixed to a mounting 212, with said mounting 212 fixed at the door trim panel. Preferably, said mounting 212 is integrally developed with said door trim panel 200.

The airbag module 104 is clipped into the mounting 212, with the airbag lance 210 of said airbag module 104 at least in part accommodated by said mounting 212. The abutment 214, whose task it is to effectively absorb forces occurring in vertical direction as a result of the airbag module 104 being triggered, serves as additional stabilization in vertical direction. To this end, said abutment 214 is preferably comprised of metal, and either configured at the door trim panel 200 or at the inside door panel 218. For this purpose, it is suggested that the abutment 214 be developed in the form of a punching from the inside door panel. For optimal force absorption, said abutment 214 features a combination consisting of a groove and a flange, with said groove provided to accommodate the airbag lance 210, and said flange fixed at the inside door panel 218 or at the door trim panel 200. For optimal force absorption, said abutment 214 should be placed in center beneath said gas sack 208.

The inside door panel 218 and the door trim panel 200 are designed as deployment channel for the gas sack 208 of the airbag module 104. Thus, using the additional rear panel 216 as deployment channel for said gas sack 218 may be dispensed with. If, however, using said inside door panel 218 as part of the deployment channel is not possible due to its design, an additional rear panel 216 may assume this task.

The airbag module 104 is connected to both the inside door panel 218 and the door trim panel 200, as well as, if necessary, to the rear panel 216 via fasteners.

When the air bag module 104 is triggered, the gas sack 208 deploys upwards in vertical direction. For one, resulting forces are absorbed by the abutment 214, as well as by the mounting 212. Due to the dimensionally stable connection between the door trim panel 200 and the inside door panel 218 the direction of deployment of the gas sack 208 is fixed, and it is not possible for the door trim panel 200 to separate in horizontal direction in the area of the mounting 212. Said door trim panel comprises a hinge 228. Said hinge is preferably located above the airbag lance 210, and is realized for example through a weakening of the door trim panel 200, and thus, if need be, through a weakening of the decorative layer 206. Since said door trim panel 200 has a bent shape, the surface 234 of the said door trim panel 200 is pivoted away into the direction 232 when the gas sack 208 is pressed on said surface 234. For said surface 234 to be able to pivot away in said direction 232, said surface 234 of the door trim panel 200 must be detachable either at the transition 230 between said door trim panel 200 and the inside door panel 218, or it must be detachable from a further portion of said door trim panel 200 in the form of a predetermined breaking point.

By folding the surface 234 in the direction 232 the gas sack 208 may deploy along the disk 238 and extend in the direction of the A and B column of the vehicle. To this end, said disk 238 is not required for the airbag's full functionality. Since the door trim panel 200 leans around the hinge 228 in the direction 232, an additional net strip 236 ensures a stable, additional hinge-like connection of the folded surface 234 to the lower portion of the door trim panel 200 fixed with fasteners 226. This guarantees that said surface 234 cannot detach, which would present a significant risk of injury for the passengers.

In the embodiments shown here the surface 234 is folding out in the direction 232, namely in the direction of the vehicle interior. If, however, such a fold out in the direction 232 is not desired, the option exists in a further embodiment to insert a predetermined breaking point 220 into the door trim panel 200 instead of the hinge 228 and the predetermined breaking point 222, or the transition 230. In this case, said transition 230 serves as a hinge, and the surface 234 breaks at said predetermined breaking point 220 when the airbag deploys. In this connection, the predetermined breaking points may be inserted through milling or laser treatment. As an alternative, providing predetermined breaking points may also already be possible by way of an injection-molding method when the door trim panel is produced.

In this case, the surface 234 folds in the direction 240, i.e. away from the vehicle interior. A clean deployment of the gas sack 208 in vertical direction is still guaranteed. However, this may require the additional use of a rear panel 216 in order to lend adequate stability to the deploying airbag.

Alternatively to using the net strip 236, using a metal or plastic or leather or textile hinge is also an option.

Figure 3:
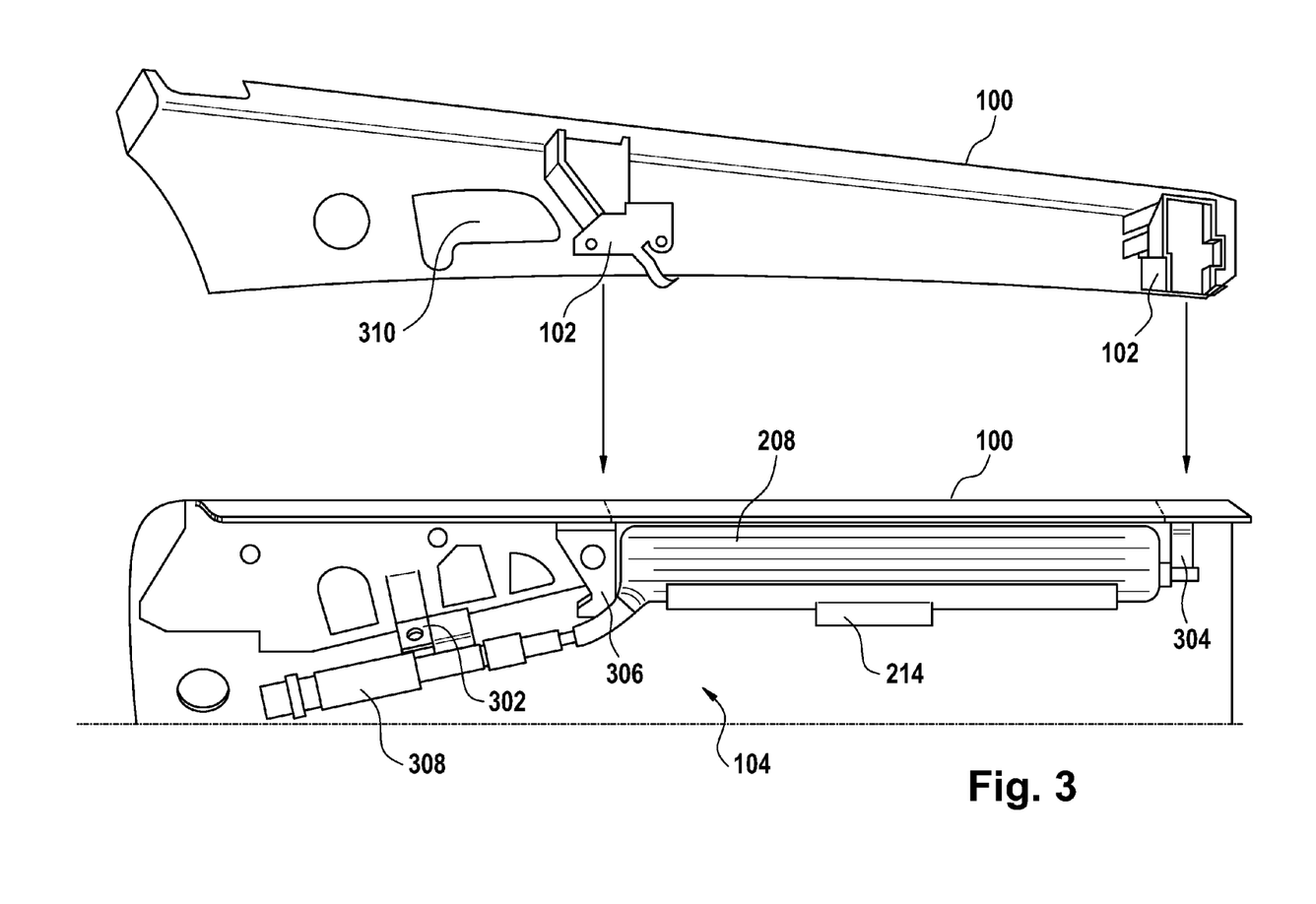
FIG. 3: shows a schematic view of an installed airbag module at a mounting according to the invention at a vehicle door.

FIG. 3 shows a schematic view of an installed airbag module 104 at a mounting 102 according to the invention at a vehicle door or at its door's armrest 100. Said airbag module 104 is mounted at the opposite ends 304 and 306 of the gas sack 208. In the present case an additional mounting 302 to fix the gas generator 308 of the airbag module 104 is provided. The abutment 214 in turn serves to support the airbag module 104 and thus accommodate the forces acting in vertical direction when triggering said airbag module 104 and thus the vertical deployment of said gas sack 208. The installation of the door trim panel 100, the airbag module 104 as well as the inside door panel 218—not shown here—is preferably carried out at the installation points 304 and 306, which essentially coincide with the position of the components 102 at the same time. This guarantees that forces that occur when the airbag module 104 is triggered can effectively be absorbed by the door trim panel 100 or by the inside door panel 218. In this connection, for a simplified installation it is suggested to arrange a joint fastening of door trim panel 100, airbag module 104 and inside door panel 218 in the vicinity of position 310 of the vehicle door's closing pull handle. It should be noted again that the joint installation of door trim panel 100, airbag module 104 and inside door panel 218 is preferably carried out with only two screw connections or, alternatively to the screw connections, with other rigid fasteners.

Figure 4:
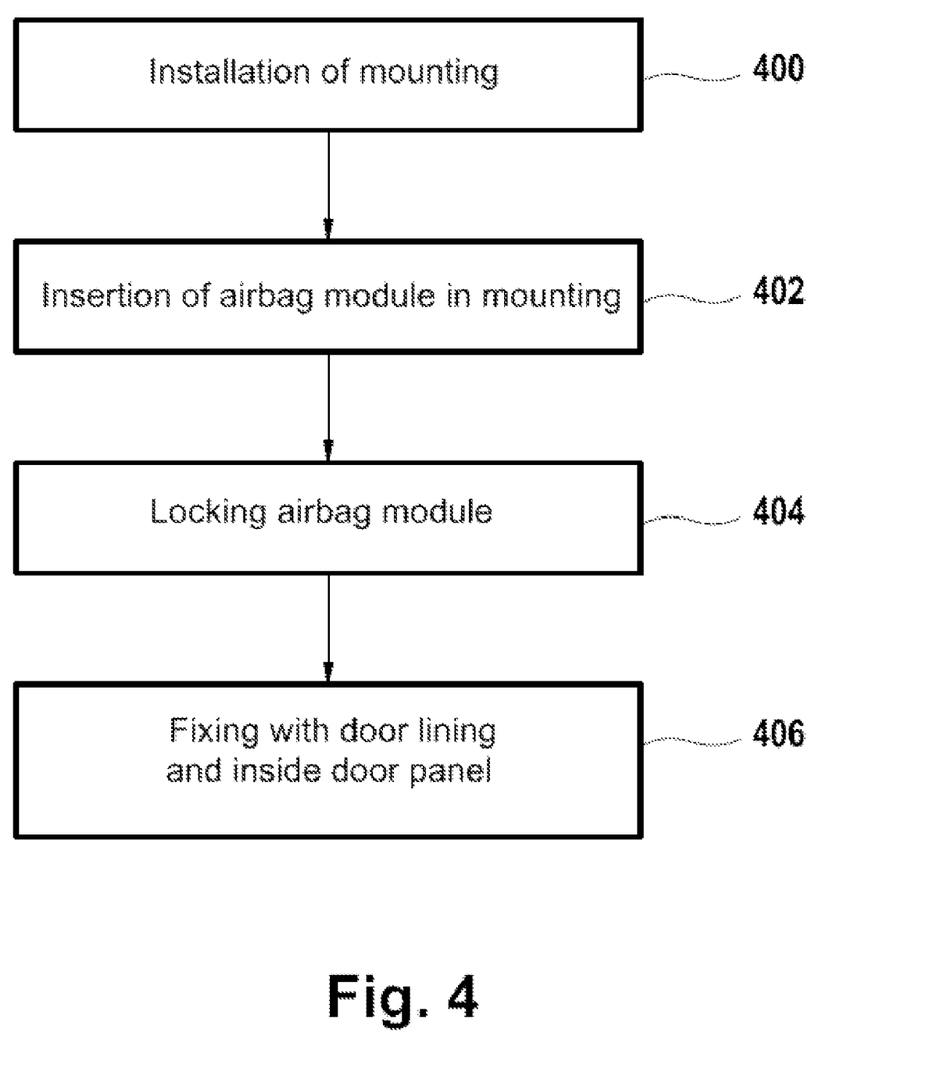
FIG. 4: a block diagram of the method according to the invention for installing an airbag module at a vehicle door.

FIG. 4 shows a block diagram of the method according to the invention for installing an airbag module at a vehicle door. In step 400 the installation of the mounting at the door trim panel or at the inside door panel takes place. This step, however, is necessary only, if the mounting is not integrally developed with the door trim panel or the inside door panel. In step 402 the airbag module is inserted into the mounting, with the insertion of the airbag module preferably taking place through a purely horizontal movement. Due to the insertion of the airbag module into the mounting, the airbag module locks with the mounting in step 404. Since the mounting according to the invention is designed by at least two components arranged at a distance relative to each other, it is sufficient for such locking to occur with at least one of these two components by means of an appropriate locking connection, e.g. a snap joint. In step 406, finally, fixing of door trim panel, airbag module and inside door panel takes place in one work step through joint fasteners.

Figure 5:
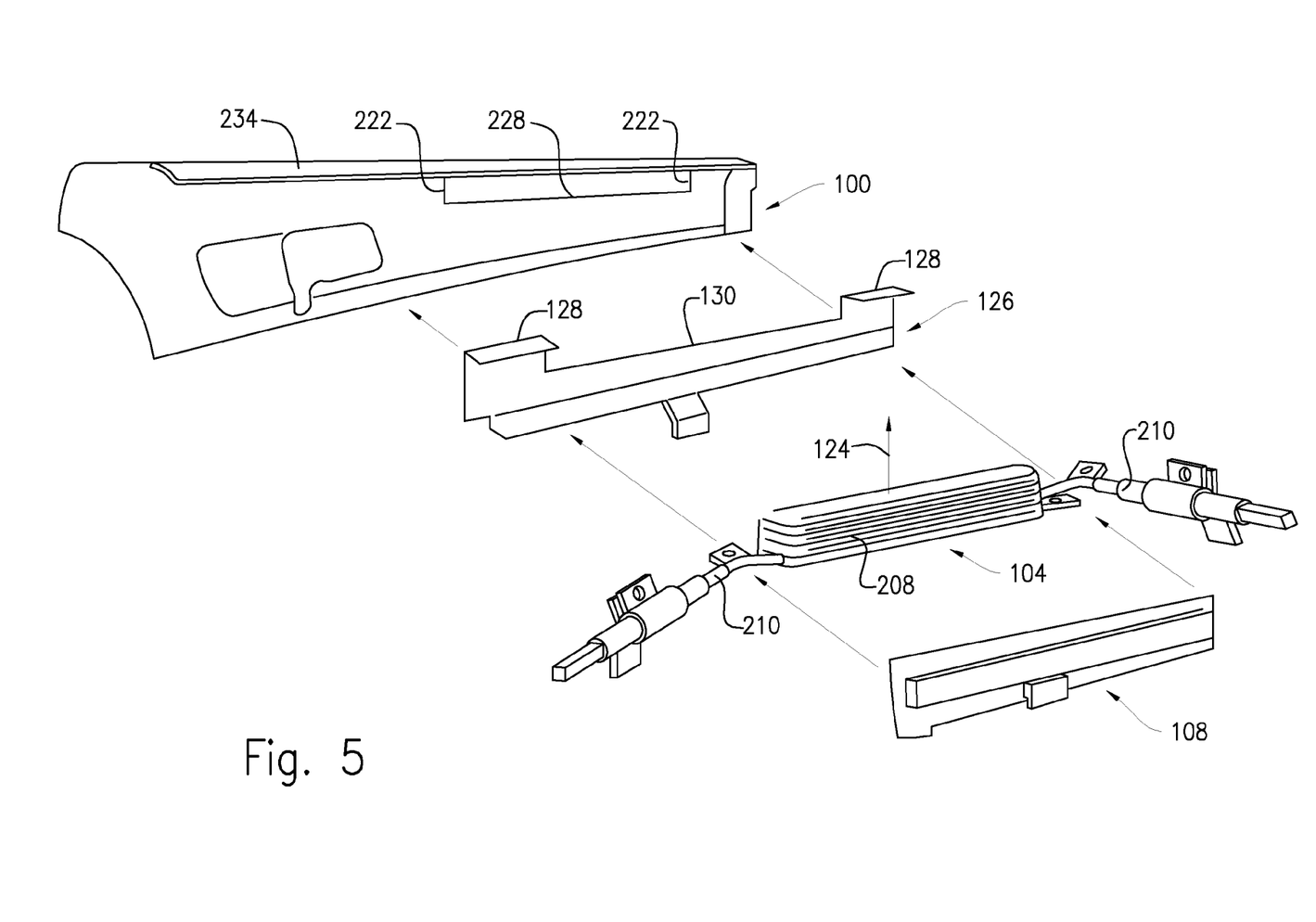
FIG. 5: shows a schematic view of a design of a door trim panel of a vehicle door.

FIG. 5 shows a schematic view of a design of a door trim panel 100 of a vehicle door comprising an airbag module 104. According to prior art, the door trim panel 100—in addition to the airbag module 104—comprises a reinforcement part 126 inserted into the door trim panel 100, with the airbag module 104 inserted into the reinforcement part 126. Moreover, according to prior art, a rear panel 108 is necessary, with the rear panel 108, in conjunction with the reinforcement part 126 and the door trim panel 100, forming an opening—also referred to as deployment channel—, in which the airbag module 104, particularly the gas sack 208 of the airbag module 104, is enclosed.

In case the airbag module 104 is triggered, the gas sack 208 deploys into the direction 124. This generates great forces that affect the area 234 of the door trim panel 100. The door trim panel 100 is comprised of predetermined breaking points 222 that are intended to break or rupture when said forces affect said area 234. In the area 228 the door trim panel 100 features a defined pre-weakening that works as a hinge when the airbag's gas sack 208 deploys. The door trim panel 100 ruptures at the predetermined breaking points 222, said area 234 pivots about the hinge axis of said hinge 228, and the gas sack 208 of the airbag module 104 can escape into the direction 124 from the opening formed in this way into the vehicle interior.

The reinforcement part 126 now has the task to direct the resulting great forces accordingly. If the door trim panel 100 were to be used exclusively in the form shown here without the reinforcement part 126, the resulting forces would cause the door trim panel 100—instead of releasing an opening in the area 234—to be pushed into the vehicle interior. To avoid this, the reinforcement part 126 is comprised of various reinforcements 128 and 130. To this end, the reinforcements 128 are located directly next to the predetermined breaking points 208. The reinforcement 130 is also located directly beneath the hinge 228. This way, the forces that occur as a result of the deploying airbag 208 are directed to the area 234, leading the door trim panel 100 to rupture at the predetermined breaking points 222. Thus, the door trim panel 100 remains dimensionally stable around the area 234 that opens up for the gas sack to deploy.

Due to the vehicle door according to the invention comprising the door trim panel 100 the reinforcement part 126 is now integrated into said door trim panel 100 to realize the same actual situation. Such integration is realized in the present case through the integral production of the door trim panel and the deployment channel, e.g. by means of an injection-molding method.

Figure 6:
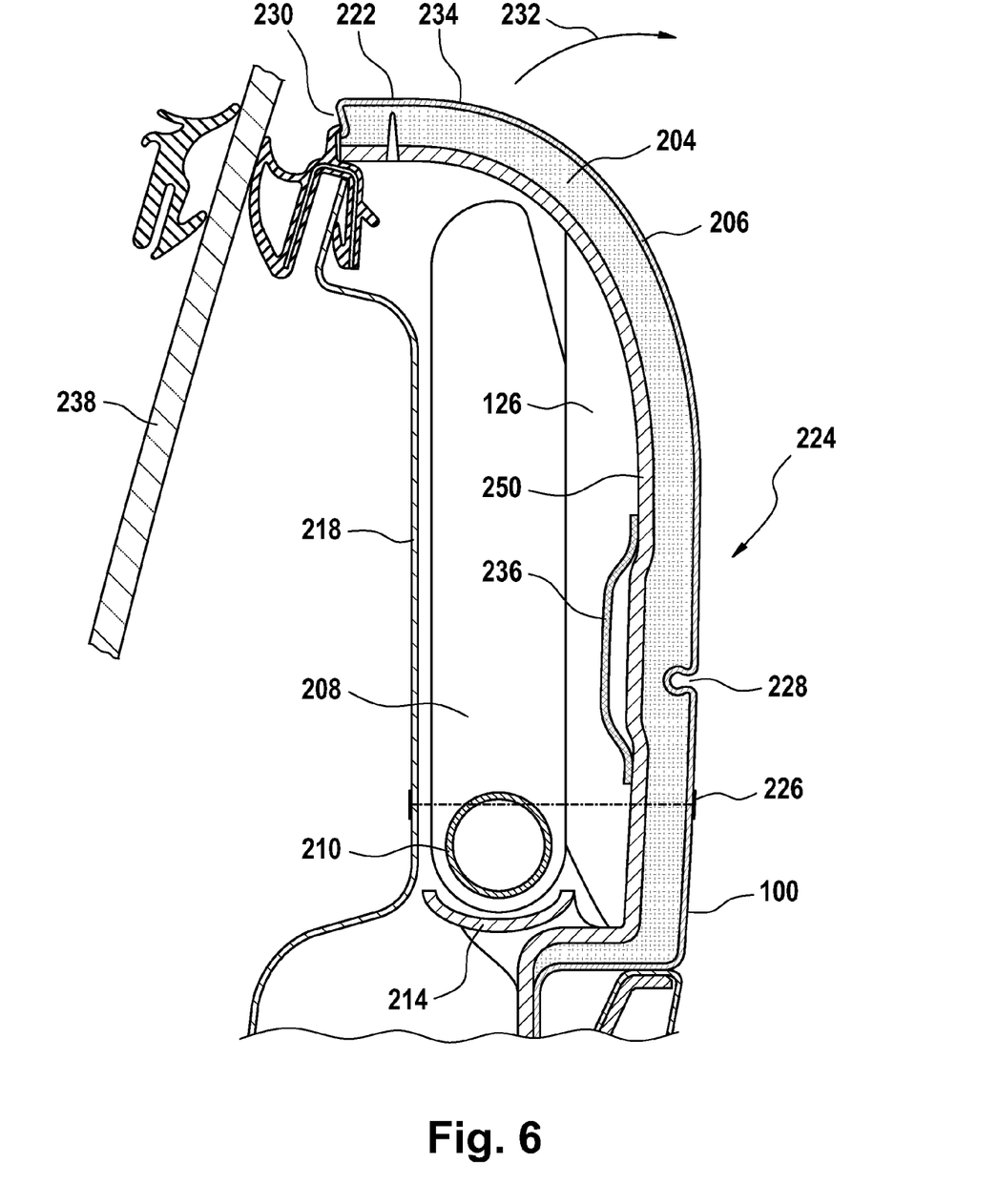
FIG. 6: shows a schematic view of a vehicle door according to the invention.

FIG. 6 shows a schematic view of a vehicle door according to the invention. In this connection, the reinforcement part 126 is integrated into the door trim panel 100. However, the process of manufacturing the door trim panel 100 and the reinforcement part 126 as an integral piece may result in the problem that corresponding impressions of the massive reinforcement part 126 may appear on the door trim panel support 250 on the side facing the vehicle interior. To cover this, it is suggested to provide the door trim panel support 250 with a foam layer 204 and a decorative layer 206 in the usual manner. Usually, such a foam-backing is required only for upper vehicles categories due to the high cost involved. Foam-backing the decorative layer 206 causes the door trim panel 100 to have a higher perceived quality, which makes it possible to do without separate components to form the deployment channel, thus representing a very cost-effective solution.

FIG. 6 also shows the inside door panel 218. In the present embodiment the inside door panel 218 assumes the task of the rear panel 108, as shown in FIG. 5. This allows to do without said rear panel 108 without losing the functionality of the safety device formed by the airbag. Besides the gas sack 208, the airbag 104, among other things, is comprised of the airbag lance 210. The airbag 104 is fixed with fasteners at the inside door panel 218 and the door trim panel 100 via the airbag lance 210. However, in order to effectively direct the forces occurring in the deployment channel 126 of the airbag module 104 into the vertical deployment direction of the gas sack 208 during deployment of said gas sack 208, the vehicle door further comprises an abutment 214 arranged below the airbag lance 210 of the airbag module 104. To this end, said abutment 214 is intended to support the airbag module 104 in vertical direction. Preferably, said abutment 214 is integrally developed with the door trim panel 100 or the inside door panel 218. Said abutment 214 may for example be punched from the inside door panel.

If the airbag module 104 is triggered, the gas sack 208 rapidly expands in vertical direction. If the gas sack 208 touches the door trim panel 100 in the area 234, the door trim panel 100 is affected by strong forces in said area 234. The reinforcement part 126 integrated into the door trim panel 100 now directs said forces such that the door trim panel 100 is folded away from the position—shown curved—in the direction 232 at a transition 230 of said door trim panel 100 in the area of the window pane 238. This folding process is favored by the hinge 228 developed at the door trim panel 100 due to targeted pre-weakening. The folding of the door trim panel 100 causes an opening area to be freed, through which the gas sack 208 can escape along the window pane 238. It must be noted that a window pane is not required for the airbag safety device to completely function. The airbag is sufficiently stable after deployment to fulfill its safety function for the protection of the passenger's head.

Folding of the area 234 in the direction 232 around the hinge 228 may be controlled by an additional net strip 236, which is developed from a tear-resistant material and which connects the area 234 of the door trim panel 100 with that section of the door trim panel 100 that is not folded. By appropriately designing the net strip 236 it is for example possible to configure the folding angle of the area 234 in the direction 232 in such a way that a corresponding risk of injury to passengers is prevented as much as possible as a result of the impact caused by the area 234 of the door trim panel 100.

Alternatively to the door's detachment in the area 234 of the door trim panel 100 at the transition 230 of the vehicle door, there is also the possibility of inserting a predetermined breaking point 222. However, for the safety device to be fully functional it is necessary to insert an additional reinforcement of the door trim panel 100 between the transition 230 and the predetermined breaking point 222. Otherwise, defined rupturing of the door trim panel 100 at the predetermined breaking point 222 is not guaranteed.

Figure 7:
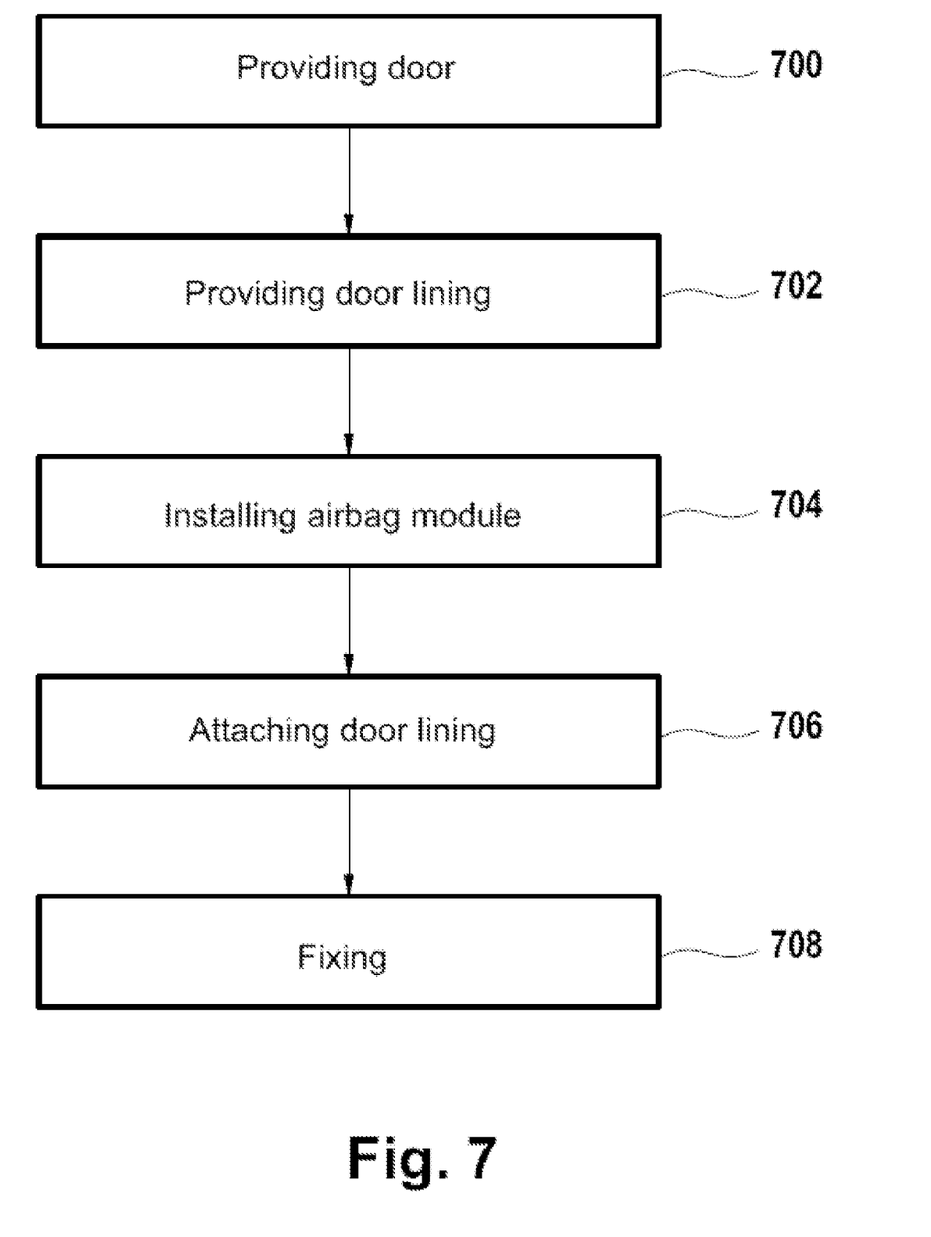
FIG. 7: a block diagram of a method according to the invention for installing an airbag module.

FIG. 7 shows a block diagram of a method according to the invention for installing an airbag module. In step 700 a vehicle door is provided, with said vehicle door comprising an inside panel. In step 702 a door trim panel is provided, with one section of the door trim panel comprising predetermined breaking points, with the section of said door trim panel developed in a rotatable manner around a swivel axis by separation at said predetermined breaking points, with the section of said door trim panel provided for the escape of the gas sack of said airbag module, with reinforcement means developed around the section of said door trim panel, with said reinforcement means integrally developed with said door trim panel, with said door trim panel comprising a foam layer and a decorative layer on the side facing the vehicle interior. To this end, the door trim panel, along with the reinforcement means, is integrally produced in one work step. Such production can for example be realized by means of an injection-molding method.

Typically, the relevant pre-weakened sections are inserted into the door trim panel along with the reinforcement means after said door trim panel is produced. Such pre-weakened sections can for example be perforations, they can be realized through reduced cross-sections that were inserted earlier by the aforementioned injection-molding method, or they can be inserted through corresponding laser, milling and cutting, grinding, hot knife and cold knife methods. The foam and decoration layers are then applied. In this connection, the foam and decoration layers do not require separate material weakening, since simple detachment can be guaranteed under the pressure of the deploying airbag when the airbag is triggered due to the corresponding material selection. It is however essential that pre-weakening areas of the door trim panel are not visible on the side facing the vehicle interior. This applies particularly also, if additional pre-weakening of said vehicle interior lining becomes necessary after all due to a corresponding unfavorable material situation of the foam and decoration layers.

After providing the door trim panel in step 702, mounting the airbag module to the provided vehicle door or to the provided door trim panel takes place in step 704. In step 706 the door trim panel is mounted to the vehicle door, with the gas sack of the airbag module enclosed by an opening as a result, with said opening limited by the inside door panel and the door trim panel by the reinforcement means injected there. Finally, the vehicle door, the airbag module and the door trim panel are jointly fixed through joint fasteners in step 708.

REFERENCE LIST

100 Door trim panel
102 Component
104 Airbag module
106 Gas sack ends
108 Rear panel
126 Reinforcement means
128 Reinforcement
130 Reinforcement
200 Door trim panel
204 Foam-backing
206 Decorative layer
208 Gas sack
210 Lance
212 Mounting
214 Abutment
216 Rear panel
218 Inside door panel
220 Predetermined breaking point
222 Predetermined breaking point
224 Vehicle door
226 Fastener
228 Hinge
230 Transition
232 Direction
234 Surface
236 Net strip
238 Disc
240 Direction
250 Door trim panel support
302 Mounting
304 Installation point
306 Installation point

308 Gas generator
310 Closing pull handle

The invention claimed is:

1. A door trim panel with a mounting for an airbag module for a vehicle door, wherein the mounting comprises at least two components configured to extend from the door trim panel and arranged at a distance relative to each other, with said components provided to accommodate an airbag module, the airbag module comprising a gas sack, with at least one of said components designed to develop a locking connection with a portion of said airbag module external the gas sack, with said door trim panel further comprising an abutment, with said abutment arranged beneath said airbag module, with said abutment extending vertically from the door trim panel, a door trim panel support or an inside door panel to support the airbag module.

2. A door trim panel in accordance with claim 1, with the components to accommodate an airbag lance essentially provided at opposite ends of the gas sack of the airbag module.

3. A door trim panel in accordance with claim 1, wherein the locking connection comprises a snap joint.

4. A door trim panel in accordance with claim 1, wherein the mounting is fixable to said door trim panel by means of fasteners.

5. A door trim panel in accordance with claim 1, wherein the mounting is integrally developed with said door trim panel.

6. A door trim panel in accordance with claim 1, wherein said door trim panel comprises at least one pre-weakened section, with said pre-weakened section provided for the escape of the gas sack of the airbag module, wherein a portion of said pre-weakened section of said door trim panel is foldable in the form of a flap upon escape of the gas sack, with the mounting for reinforcing the area essentially developed around said pre-weakened section.

7. A door trim panel in accordance with claim 6, wherein said flap is connected to said door trim panel through at least one hinge-like tear-resistant material.

8. A door trim panel in accordance with claim 1, wherein an inside door panel and said door trim panel provide a deployment channel for the gas sack of the airbag module.

9. A door trim panel in accordance with claim 1, further comprising a rear panel, with said rear panel arranged at an inside door panel, wherein said rear panel and said door trim panel provide a deployment channel for the gas sack of the airbag module.

10. A method for installing an airbag module at a vehicle door, with said vehicle door comprising a mounting for said airbag module, with said mounting developed by at least two components arranged at a distance relative to each other, with said components provided to accommodate an airbag module comprising a gas sack, with at least one of said components designed to develop a locking connection with said airbag module, comprising the steps of:
 Inserting a portion of said airbag module external the gas sack into the mounting,
 Locking said airbag module with at least one of said components through said locking connection,
 jointly fixing a door trim panel of the vehicle door with said airbag module and an inside door panel of the vehicle door,
wherein the vehicle door comprises an abutment developed at said door trim panel or at the inside door panel, with said abutment arranged beneath said airbag module, with said abutment extending vertically from the door trim panel, the door trim panel support or the inside door panel to support said airbag module.

11. An installation method in accordance with claim 10, further comprising the step of fixing the mounting at the inside door panel or at the door trim panel.

12. An installation method in accordance with claim 11, further comprising the step of fixing a rear panel at the inside door panel.

13. An installation method in accordance with claim 12, further comprising the step of joint fixation of the rear panel with the door trim panel of the vehicle door and the airbag module and the inside door panel of the vehicle door.

14. A method in accordance with claim 10, wherein locking the airbag module is accomplished by means of a snap joint.

15. A method in accordance with claim 10, wherein the step of jointly fixing is accomplished through joint fasteners.

16. An inside door panel with a mounting for an airbag module for a vehicle door, with said mounting developed by at least two components arranged at a distance relative to each other, with said components provided to accommodate an airbag module comprising a gas sack, with at least one of said components designed to develop a locking connection with a portion of said airbag module external the gas sack, the vehicle door comprising a door trim panel further comprising an abutment, with said abutment arranged beneath said accommodating airbag module, with said abutment extending vertically from the door trim panel or a door trim panel support to support the airbag module.

17. An inside door panel in accordance with claim 16, further comprising a rear panel, with said rear panel along with the door trim panel developed as a deployment channel.

* * * * *